Aug. 9, 1938.   J. E. GLEASON   2,126,004
CUTTER FOR AND METHOD OF CUTTING GEARS
Filed Feb. 15, 1934   3 Sheets-Sheet 1
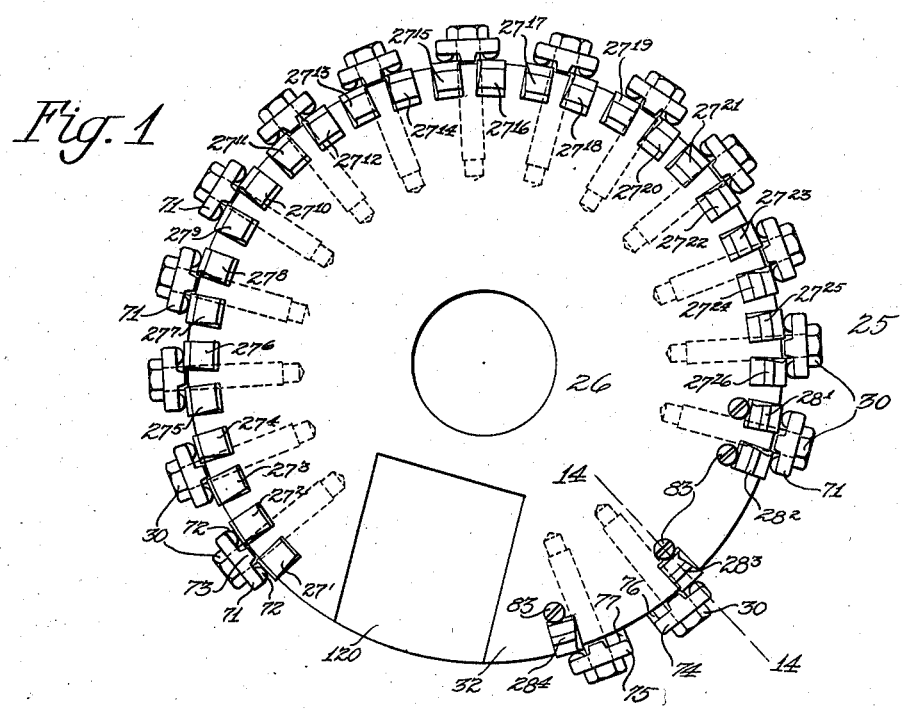
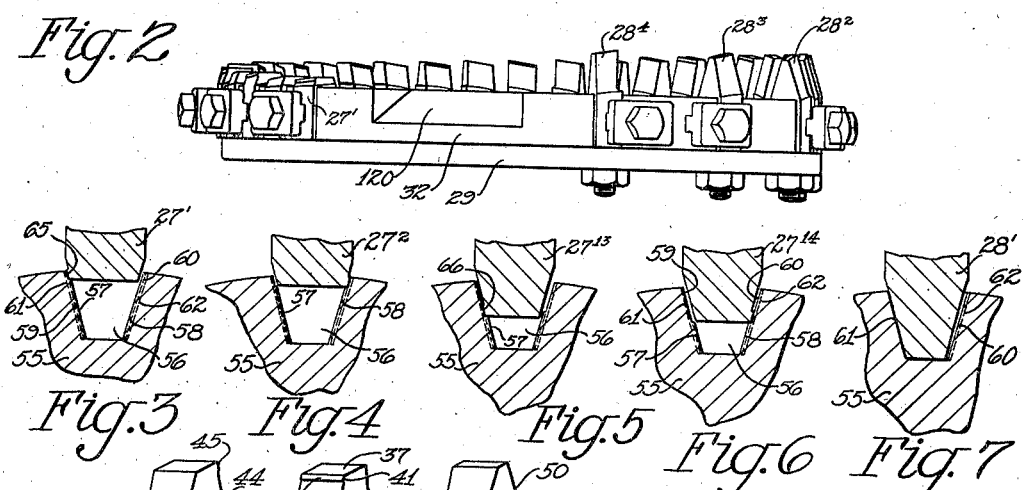
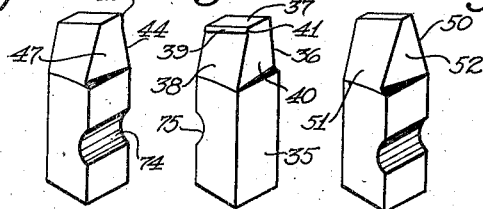
Inventor
James E. Gleason
Attorney

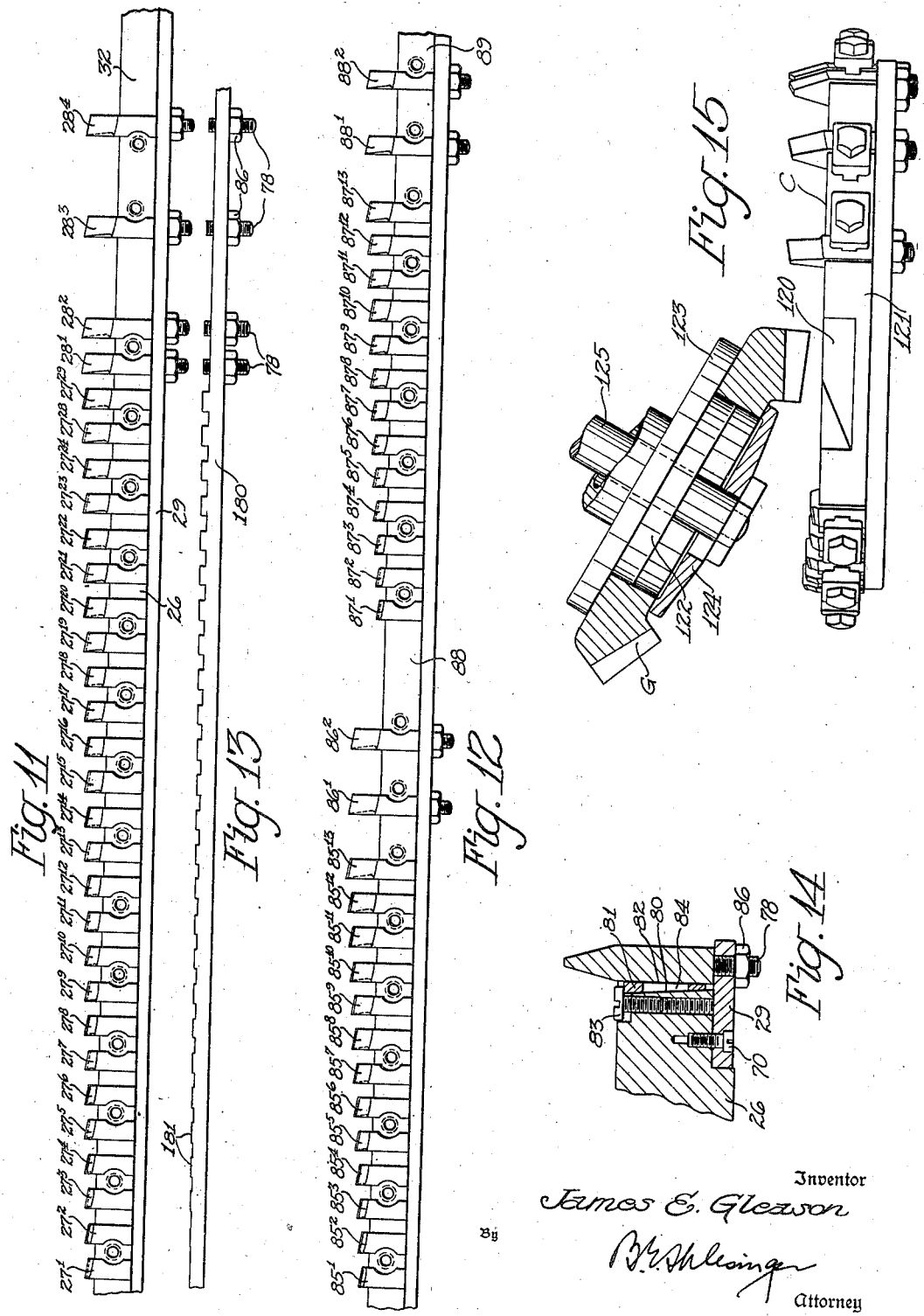

Aug. 9, 1938.   J. E. GLEASON   2,126,004
CUTTER FOR AND METHOD OF CUTTING GEARS
Filed Feb. 15, 1934   3 Sheets-Sheet 3
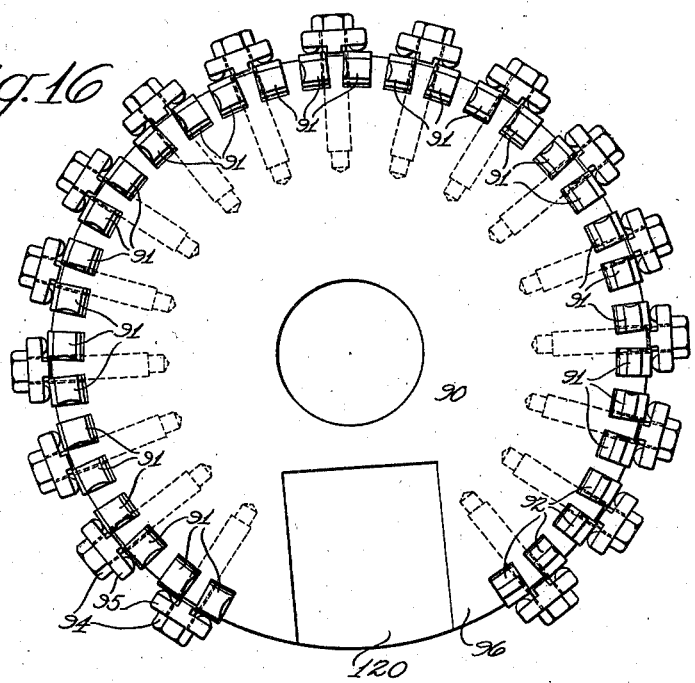
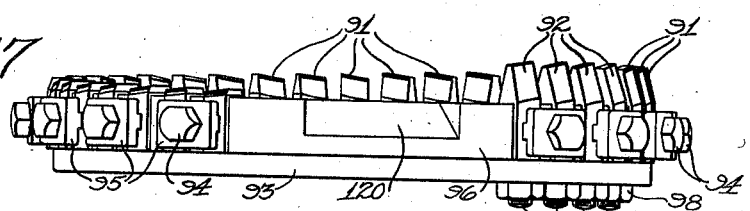
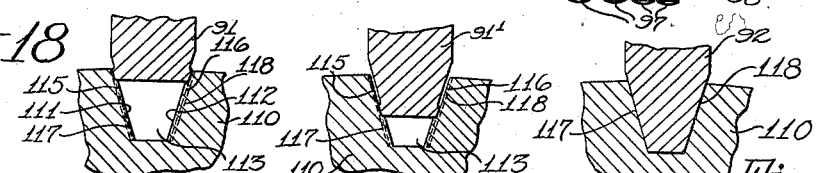
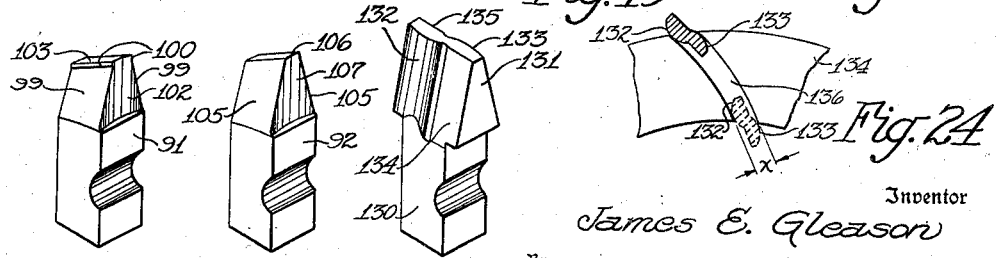
Inventor
James E. Gleason
By B. F. Schlesinger
Attorney Patented Aug. 9, 1938

2,126,004

UNITED STATES PATENT OFFICE 2,126,004

CUTTER FOR AND METHOD OF CUTTING GEARS

James E. Gleason, Rochester, N. Y., assignor to Gleason Works, Rochester, N. Y., a corporation of New York Application February 15, 1934, Serial No. 711,382

23 Claims. (Cl. 90—4)

The present invention relates to the production of gears and more especially to the production of longitudinally curved tooth gears such as spiral bevel and hypoid gears.

It has been known for a number of years that correctly-meshing gears can be produced when one member of the pair is cut in a forming process and the other member of the pair is generated conjugate to the form-cut gear. Theoretically, a gear pair produced by such a method of production should be cheaper than a standard generated gear pair for a form-cut gear can be cut faster than a generated gear because of the elimination of the generating roll. The described production method has not come into commercial use, however, because no satisfactory process has heretofore been devised for cutting the non-generated gear with smooth enough tooth surfaces to meet present-day requirements.

The present invention has for its purpose to obviate the difficulties heretofore experienced in the production of the non-generated gear and its primary object is to provide a tool and a method for finish-cutting longitudinally curved tooth gears which will produce form-cut gears having tooth surfaces comparable in quality of finish to gears cut by generating methods.

Still another object of the invention is to provide a method and tool for finish-cutting gears of the type described through which any errors in spacing of the teeth of a rough-cut gear blank may be eliminated in the finished gear.

A further object of the invention is to provide a method and tool for finish-cutting gears of the type described which will be extremely fast and in which the indexing of the gear-blank can be effected without periodic relative withdrawal of the tool or the blank from operative position.

A still further object of the invention is to provide a gear-cutting tool which is constructed so that a completed gear can be removed from the gear cutting machine and a new blank chucked thereon without requiring withdrawal of the work support from operative relation with the tool.

A still further object of the invention is to provide a tool of the character described which can readily be adapted for cutting gears of a wide range of tooth depths.

In a further aspect, the invention has for its purpose to provide a method and tool for finish-cutting and burnishing the side tooth surfaces of gears and particularly non-generated gears in a single operation.

Other objects of the invention will be apparent hereinafter from the specification and from the recital of the appended claims.

In the drawings:

Fig. 1 is a plan view and Fig. 2 is a side elevation of a finish-cutting tool constructed according to one embodiment of this invention;

Figs. 3 to 7 inclusive are diagrammatic views illustrating successive steps in the cutting of a tooth space of a gear according to the present invention;

Figs. 8 and 9 are perspective views of two successive stocking-out blades of the cutter shown in Figs. 1 and 2 and Fig. 10 is a perspective view of one of the finishing blades of this cutter;

Fig. 11 is a developed view of the cutter shown in Figs. 1 and 2;

Fig. 12 is a developed view showing a modified form of cutter;

Fig. 13 is a developed view of a form of backing plate such as may be used for the purpose of adapting a cutter to cut gears of different tooth depths;

Fig. 14 is a fragmentary sectional view taken on the line 14—14 of Fig. 1;

Fig. 15 is a view showing the cutter of Figs. 1 and 2 in operative relation with a bevel gear blank and illustrating how the blank may be removed from the gear cutting machine without withdrawal of the cutter or work-support from operative position;

Fig. 16 is a plan view and Fig. 17 is a side elevation of a finish-cutting tool constructed according to a further embodiment of this invention;

Figs. 18, 19, and 20 are diagrammatic views illustrating successive steps in the cutting of a tooth space of a gear with the cutter shown in Figs. 16 and 17;

Fig. 21 is a perspective view of a stocking-out blade of the cutter shown in Figs. 16 and 17;

Fig. 22 is a perspective view of a finishing blade of this same cutter;

Fig. 23 is a perspective view of one form of burnishing blade which may be used in a tool constructed according to the present invention to make the tool a combined cutting and burnishing tool; and Fig. 24 is a fragmentary view illustrating diagrammatically the action of the burnishing blade shown in Fig. 23.

In the invention, a tool is used having the general form of a face-mill. This tool has its cutting blades projecting from one side face in the general direction of its axis, but its blades extend only part-way around its periphery. There is a gap between the last blade and the first blade. In operation, the gear blank is indexed while this gap is abreast of the blank and without withdrawing the blank from operative relation with the tool.

In one construction, the gap in the tool may also be recessed so that, when this portion of the tool is abreast of the gear blank, there will be sufficient room for chucking or removal of the blank without withdrawal of the tool or work-support from operative position.

The tool has a plurality of undersized stocking-out blades followed by one or more full-sized finishing blades. The stocking-out blades are preferably made or adjusted so as to cut slightly less than the full width of the tooth spaces of the gear blank and they are graduated in height around the periphery of the tool so that successive blades cut progressively deeper into the tooth space as the tool rotates in engagement with the blank, the final stocking-out blade cutting at full depth.

The stocking-out blades are preferably made with narrow cutting lands or ribbons so that each takes only a relatively small chip and the cutting thrust of the blade on the blank is reduced to a minimum. This insures great accuracy in the spacing of the stocked-out tooth surfaces. The stocking-out blades leave only a thin film of metal to be removed by the finishing blades and, therefore, the finishing blades can be made to cut the whole height of the tooth profiles without excessive burden. Hence the finished profiles can be produced by the finishing blades in a continuous cut from top to bottom and across the whole tooth surface and the result obtained is a fine, smooth finished tooth surface, accurately spaced.

The blades may be sharpened so that each cuts on only one side of a tooth space, or they may be sharpened to cut both sides of a tooth space simultaneously. Both forms of the invention have been illustrated in the accompanying drawings.

In order that a given set of blades may cover a range of work, a series of backing-plates may be provided with a given tool so that the blades can be adjusted to cut at different heights and therefore cut gears having different depths of tooth spaces.

If it is desired to burnish the tooth surfaces after cutting them, one or more burnishing blades are used and these are arranged in the cutter head so as to follow the finishing blades. The burnishing blades are provided preferably with rounded-off burnishing surfaces on both sides and produce an ironing or burnishing action on the finished-cut tooth surfaces as they pass over the same in the rotation of the tool.

In use, the tool is adjusted initially into such operative relation with a previously roughed gear blank that its finishing blades will cut to the full depth of the tooth spaces of the blank without any relative feed motion between the tool and blank. As the tool rotates in engagement with the blank, the undersized blades first stock-out a tooth space and then the finishing blade or blades takes or take the cleaning-up cut or cuts to produce the final finished tooth surfaces. If burnishing blades are used, these follow and produce the smoothing out effect desired. Then the gap in the cutter comes abreast of the blank and the blank is indexed to bring a new tooth space into position to be cut while the cutter is still rotating at cutting speed. Thus, in every revolution of the cutter, a tooth space is finished and when the cutter has made as many revolutions as there are tooth spaces in the blank, the gear will be finished. It will therefore be seen that the present invention provides an extremely fast process for finish-cutting gears.

Reference will be made first to Figs. 1 to 11 inclusive, wherein I have shown a cutter 25 constructed according to one embodiment of my invention. This cutter comprises a rotary head 26, a plurality of stocking-out blades $27^1$, $27^2$, $27^3$, etc. and a plurality of finishing blades $28^1$, $28^2$, $28^3$, etc. The blades seat upon a backing-plate or ring 29 and are secured in radial slots in the cutter head by clamping bolts 30.

The stocking-out blades $27^1$, $27^2$, $27^3$, etc. are of progressively increasing height, as clearly shown in Fig. 11, so that they cut progressively deeper along the tooth surfaces of the gear to be cut. These blades are preferably made with cutting edges whose pressure angles are the same as the pressure angles of the tooth surfaces to be cut thereby. Therefore, they are also of varying point-width, that is, of varying widths at their tips. For blades having positive pressure angles, such as those shown in the drawings, the point-width will decrease as the blades increase in height.

In the form of cutter shown in Figs. 1 to 11 inclusive, the blades are sharpened so that each cuts on one side of a tooth space only and they are arranged in the cutter head so that alternate blades cut on opposite sides of a tooth space. Thus, the blade $27^1$ is an outside cutting blade, cutting one side of a tooth space, and the blade $27^2$ is an inside cutting blade, cutting the opposite side of the tooth surface, etc. The finishing blades are also single-sided cutting blades, the blade $28^1$ being an outside cutting blade and the blade $28^2$ being an inside cutting blade, etc.

The stocking-out blades $27^1$, $27^2$, $27^3$, are spaced equally apart around the periphery of the cutter head. These blades are arranged preferably as close together as practical so as to get as many stocking cuts as possible. They may be so close together that a number of stocking-out blades will cut simultaneously in a tooth space. The finishing blades $28^1$, $28^2$, $28^3$, and $28^4$ in the cutter shown, however, are so spaced apart circumferentially that no two blades that cut on the same side of a tooth will be cutting at the same time. Thus the outside blade $28^3$ is spaced far enough circumferentially from the outside blade $28^1$ so that the blade $28^3$ will not be cutting at the same time that the blade $28^1$ is cutting. Likewise, the inside blade $28^4$ will be spaced far enough circumferentially from the inside blade $28^2$ so that the two blades will not cut simultaneously.

Where two inside or two outside blades are so close together that they can cut simultaneously, the second blade coming into cutting engagement with the blank while the first blade is still cutting may produce a thrust on the blank that will result in a marking of the tooth surface being cut. With the described arrangement, of finishing blades, however, this is impossible. Under some circumstances, it might be desirable to carry this idea still further and space the finishing blades so far apart that no two of them could be in the cut simultaneously. This arrangement is also within the contemplation of my invention.

The space or gap between the last finishing blade $28^4$ and the first stocking-out blade $27^1$ of the cutter is denoted at 32 and this space or gap is of sufficient angular extent to permit indexing of the gear blank while this space or gap is abreast of the blank and while the cutter continues to rotate at full speed.

Each of the stocking-out blades has only a ribbon of cutting surface. In Fig. 9, an outside stocking-out blade is shown. This blade has a body portion 35, that is received in a slot of the cutter head 26, and a projecting portion 36. The blades are ordinarily made with pressure angles corresponding to the pressure angles of the tooth surfaces to be cut. For gears of positive pressure angle, then, the sides of the projecting part of the blade will converge, as shown, in the direction of the tip 37 of the blade and the angle between these sides will equal the included angle between the sides of a tooth space of the gear blank. The outside surface 38 of the projecting portion of the blade is milled or ground away to leave a narrow ribbon or land 39. This ribbon or land is relieved and constitutes the cutting surface of the blade. The front face 40 of the blade is inclined at an acute angle to this ribbon or land to produce the outside cutting edge 41 of the blade. As stated before, successive blades have cutting lands at progressively different distances from the face of the cutter head so that the cutting edges of successive blades extend at progressively different distances from the face of the cutter head and they overlap one another to cut together the whole height of the finished surface.

An inside stocking-out blade is shown in Fig. 8. This differs from the outside blade of Fig. 9 by having the cutting land and cutting edge on the opposite side of the blade. Thus the inside surface 44 of the blade of Fig. 8 is milled or ground away to provide a cutting land or ribbon 45. This land or ribbon is relieved and the front face 47 of this blade is inclined to this land 45 at an acute angle to form the inside cutting edge of the blade.

One of the finish-cutting blades of the tool is shown in Fig. 10. This blade has a cutting edge 50 which extends for the full height of the projecting part 51 of the blade. It is formed by the acute angular intersection of the front face 52 of the blade with the inside face thereof.

Each pair of outside and inside stocking-out blades is so formed or so arranged that the pair of blades cut less than the full width of a finished tooth slot of the blank. The finishing blades on the other hand, are so formed or so arranged in the cutter head that a pair of outside and inside finishing blades will cut the full finished width of the tooth slots from top to bottom on the two sides.

The operation of this cutter is illustrated in Figs. 3 to 7 inclusive. A fragmentary portion of the gear blank to be cut is shown and is designated 55. 56 denotes a previously roughed-out tooth space of the gear blank which is to be finish-cut by the tool and method of the present invention. This roughed-out tooth space is bounded by the sides 57 and 58. The dotted lines 59 and 60 indicate the amount of stock which is to be removed by the stocking-out blades $27^1$, $27^2$, etc. of the cutter. The lines 61 and 62 denote the positions which the sides of the finished tooth space are to occupy.

The gear blank is adjusted into engagement with the cutter so that the stocking-out blade $27^1$ will cut first and so that the finishing blades $28^1$, $28^2$, etc. will cut to the full depth of the tooth space of the blank without any feed motion of the cutter or of the blank. The gear blank 55 is held stationary during cutting, and cutting is effected by rotating the cutter in engagement with the blank.

The cutting blade $27^1$ is an outside cutting blade and has an outside cutting land 65. As this blade moves across the face of the blank, it removes a narrow chip of stock at the top of the side 57 of the tooth space 56. The next blade $27^2$ is an inside cutting blade and removes a similar chip from the opposite side 58 of the tooth space 56. The succeeding blades of the cutter are of progressively increasing heights and their narrow cutting edges cut chips further down on the sides of the tooth space 56.

One of the intermediate blades $27^{13}$ is shown in Fig. 5. This blade is of such height that its ribbon cutting surface removes stock from the side 57 of the tooth space about midway the height of this side. The succeeding blade $27^{14}$ removes stock from the opposite side 58 of the tooth space about midway the height of the side 58.

When the final stocking-out blade $27^{26}$ has passed through the tooth space 56, all of the stock between the sides 57 and 58 of the roughed-out space and the lines 59 and 60, respectively, will have been cut away. Then the finishing blade $28^1$ will take its cut. It operates along the whole length of the tooth profile and will cut away the stock between the line 59 and the line 61, leaving a finished tooth surface 61. The following blade $28^2$ will cut on the opposite side of the tooth space for the full height of that side and remove stock between the lines 60 and 62, leaving the finished tooth side 62. The two other finishing blades $28^3$ and $28^4$ are simply provided to insure a clean finish. If there is any spring of the blades $28^1$ and $28^2$ away from the sides of the cut, the blades $28^3$ and $28^4$ will clean up the stock and leave a finished tooth space of the required width, smoothness and spacing.

As soon as the finishing blade $28^4$ has passed through the tooth space, the blank is indexed. This is done without withdrawing the blank from the cutter and without slowing down or stopping the cutter, for the gap 32 of the cutter is abreast of the blank at this time and the blank can be rotated for indexing without interfering with the cutter. In the next revolution of the cutter, the blades cut in a new tooth space of the blank and so when the cutter has made as many revolutions as there are tooth spaces on the blank, the gear will be finished. In other words, the gear will be finished when it has been indexed through one revolution.

With a cutter such as described, the undersized stocking-out blades have only a small amount of metal to remove and they do not produce any substantial thrusts on the blank in cutting. The finish-cutting blades, while cutting for their whole length, have only a thin skin of stock to remove and they too produce no substantial thrusts when cutting. The elimination of thrusts eliminates the primary cause of indexing errors in cut gears and hence, when gears are cut by the present invention, the greatest accuracy in tooth spacing is obtainable.

The backing-ring or plate 29 is secured to the cutter head 26 (see Fig. 14) by screws 70 and the stocking-out blades are seated against the upper face of this ring and clamped in the slots of the cutter head. One clamping bolt 30 cooperates with a clamping plate 71 to hold a pair of stocking-out blades in the head. Each clamping plate 71 is provided on its inner face with a pair of clamping bosses 72 and with a centering lug 73. The clamping bosses are spaced to engage the outside surfaces of two adjacent blades while the centering lug 73 serves to center the clamping plate between the two blades to be clamped thereby.

The body portions of a pair of blades are provided with opposed, semi-cylindrical recesses 74 and 75, as shown clearly in Figs. 8 and 9. These recesses receive the stem of a clamping bolt 30. A pair of blades are clamped in position by passing the stem of a bolt 30 through a hole centrally located in a clamping plate 71 and between the recesses 74 and 75 of the pair of blades and then threading the bolt into the cutter head.

The finishing blades $28^1$ and $28^2$ are secured in the cutter head by bolts 30 and clamping plates 74 and 75, respectively. The plates 74 and 75 differ slightly in construction from the clamping plates 71. They have only one boss 72 and have square lugs 76 and 77, respectively, which take the place of the other boss 72. The square lugs 76 and 77, respectively, bear directly upon the periphery of the cutter head so that when the bolts 30 are tightened up, the clamping plates 74 and 75, respectively, will securely hold the blades $28^3$ and $28^4$, respectively, in the cutter head.

Since the stocking-out blades do not produce the final tooth form, they do not have to have any fine adjustment in the cutter head. They are simply made as close as possible to the size desired and clamped fixedly in the cutter head. The finishing-blades, however, determine the final shape and size of the tooth spaces of the gear. They are secured in the cutter head 26 for radial adjustment and for adjustment height.

For the purpose of radial adjustment the inside walls 80 (Fig. 14) of the slots in the cutter head, which receive the finish cutting blades, are inclined with reference to the axis of the cutter head and a wedge adjusting member 81 is inserted between the side wall 80 of each of these slots and the inside surfaces 82 of the body portions of the finishing blades. The wedges 81 are adjusted by means of screws 83, which engage in threaded openings in the cutter head and are arranged so that their heads engage the wedge members 81. There is an enlarged slot or opening 84 in each wedge member 81 through which the clamping bolt 30 may be passed. The finishing blades are each adjusted for height by screws 78 which thread into the backing plate 29. A lock-nut 86 is threaded on each of the screws 78 to hold it in position after adjustment.

When the bolt 30 is loosened, a finishing blade can be adjusted radially by rotation of the screw 83 and for height by rotation of the screw 78. The radial adjustment of the finishing blades permits of spacing the outside cutting edge of one blade from the inside cutting edge of the succeeding blade so as to cut the proper width of tooth slots in the blank. The height adjustment permits of adjusting the blades to cut the tooth surfaces of the gear blanks to their full depth and may be used also in conjunction with the radial adjustment to control the width of the tooth spaces to be cut.

For production work, sets of stocking blades can be used which are designed to cut a given tooth depth and which have cutting edges that overlap just enough to insure complete removal of the stock. For ordinary conditions, however, it is preferable to design a set of cutting blades so that it can be used to cut any gears within a given range of tooth depths. This means making the stocking blades with cutting edges that will overlap sufficiently to cut completely any gear having the maximum tooth depth within the given range and then using these blades with interchangeable backing plates, as will be described hereinafter, so as to adjust them to cut the tooth depth required for a particular gear.

To illustrate: Let us assume that the set of blades shown in Fig. 11, when used with the backing plate 29 shown in this figure will cut a gear of a given tooth depth and that these cutting lands of these blades have enough overlap to cut gears of a different tooth depth, then by using a stepped backing plate, such as shown at 180 in Fig. 13, this same set of blades can be employed to cut a gear of a different tooth depth. The backing plate 180 has seats or steps 181 for the stocking-out blades, which progressively increase in height and which serve to advance these blades axially beyond the positions they occupy when seated upon the plane sided plate 29 of Fig. 11. The finishing blades may be adjusted to the correct height by screws 78, as already described.

A whole series of stepped backing plates having steps of different heights may be used in connection with a given set of stocking-out blades to permit cutting a wide range of gears of different tooth heights.

In Figs. 1 to 11 inclusive, a cutter has been illustrated in which the blades are so arranged that alternate blades cut on opposite sides of tooth surfaces of a gear blank. A different arrangement is illustrated diagrammatically in Fig. 12. Here the inside cutting blades are arranged in one group and the outside cutting blades in another group. Thus, the inside stocking-out blades $85^1$, $85^2$, $85^3$, etc. follow one another and in turn are followed by the inside finishing blades $86^1$, and $86^2$, and the outside stocking-out blades $87^1$, $87^2$, etc. follow one another and are followed by the outside finishing blades $88^1$, and $88^2$. Sufficient space will be left between the groups of blades at either 88 or 89, as may be desired, so as to permit indexing of the gear blank without withdrawal of the same from operative relation with the cutter.

A suitably designed stepped backing-plate can, of course, be used, also, in a cutter of the type last described in order to use the same set of blades for cutting gears of different tooth depths.

In Figs. 16 to 22 inclusive, I have illustrated a further possible modification of the present invention. Here each cutting blade is provided with two side cutting edges so that the blade cuts on both sides of the tooth space simultaneously. Under some conditions, this construction is advantageous because with each blade cutting on both sides, the cutting thrusts are balanced and greatest accuracy in the spacing of the tooth surfaces of the finished gear is the result.

90 designates the cutter head, 91 the stocking-out blades and 92 the finishing blades of this cutter. The blades are seated as before upon a backing plate or ring 93 and are clamped in slots in the cutter head by bolts 94 and clamping plates 95. There is a gap 96 between the last and the first blades of the cutter which is of sufficient angular extent to permit indexing the blank, while this gap is abreast of the blank and without withdrawing the blank from operative position. Screws 97 may be threaded into the backing plate 93 for the purpose of adjusting the finishing blades 92 for height. Lock-nuts 98 are employed with the screws 97 to secure them in any adjusted position. It is not necessary to provide for radial adjustment of the finishing blades, since the point-width of these blades is fixed in manufacture because they are double-edged blades.

One of the stocking-blades 91 is shown in perspective in Fig. 21. The sides 99 of its cutting portion are inclined to one another at an angle equal to the included angle between the sides of a tooth space of the gear to be cut. Both sides 99 are milled or ground away to leave narrow cutting ribbons or lands 100. In the form shown, the front face 102 of the blade is hollow ground so that a keen cutting edge is provided at each side of the blade by the intersection of the lands 100 with the front face 102. The tip 103 of the blades and the lands 100 are relieved back of the cutting edges in the usual manner.

One of the finishing blades 92 of the cutter is shown in perspective in Fig. 22. The sides 105 of the projecting part of this blade are inclined to one another at an angle equal to the angle between the sides of a tooth space of the gear to be cut and the width of this blade at its tip 106 is equal to the width of the tooth space at its bottom. The front face 107 of the blade is hollow-ground to provide cutting edges at each side of the blade which are the full height of the projecting portion of the blade. The sides 105 and tip 106 of the blade are relieved back of the cutting edges in the usual manner.

The stocking-out blades 91 increase progressively in height and their cutting lands 100 are at progressively increasing distances from the face of the cutter head. The point width of each stocking-out blade is less than the width of the finished blades measured at a corresponding distance from the face of the cutter head, so that the stocking-out blades leave a thin skin of metal on the sides of the tooth space to be removed by the finishing blades.

The operation of the cutter of Figs. 16 and 17 is illustrated in Figs. 18 to 20 inclusive. 110 is a fragment of the gear blank to be cut; 111 and 112 are the sides of a tooth space 113 of this blank which has been cut in a preliminary roughing operation. The dotted lines 115 and 116 indicate the amount of stock which is to be removed from the sides of the tooth space by the stocking-out blades. The lines 117 and 118 denote the positions of the finished sides of the tooth space.

The blank is adjusted into operative relation with the cutter so that the first stocking-out blade will engage it first and the remaining stocking-out blades and the finishing blades will follow one another progressively through the cut and so that the finishing blades will cut to the full depth of the tooth spaces without any relative feed between the cutter and the blank. The first stocking-out blade 91 removes metal from both sides of the roughed tooth space as shown in Fig. 18. The succeeding stocking-out blades cut deeper and deeper into the blank, each removing chips of metal between the lines 111—112 and the lines 115—116. One of the intermediate stocking-out blades is shown at 91¹ in Fig. 19. This blade cuts midway the height of the tooth space, removing its narrow chip of metal from the sides 111 and 112. When the last of the stocking-out blades has taken its cut, all of the metal will have been removed between the lines 111—112 and the lines 115—116. The finishing blades 92 then take off the thin skin of metal left between the lines 115—116 and the lines 117—118, producing the final finished tooth surfaces 117 and 118.

Ordinarily, only one finishing blade would be required, but several are preferably employed for greater accuracy and in order to prolong the life of the cutter. Each of the finishing blades is of the same width and pressure angle and if there is any spring of the first finishing blade away from the cut, the following finishing blades ensure removal of the correct quantity of metal.

When the last finishing blade 92 has passed through the cut, the blank will be indexed. Since the gap 96 in the cutter is at this time abreast of the blank, the indexing operation can be effected without withdrawing the blank from operative relation with the cutter.

Since each of the stocking-out blades removes only a small amount of stock and since each cuts on both sides, the cutting thrusts on these blades will be balanced and hence they will cut truly. The result will be that the blank will be stocked out with accuracy and since the finishing blades have only a thin skin of metal to remove, the spacing of the blank will be correct.

In Figs. 16 and 17, both the stocking-out blades and the finishing blades are equi-spaced around the periphery of the cutter head. However, if desired, the finishing blades might be spaced in a manner similar to those of the cutter of Figs. 1 and 2 so that only one finishing blade is in the cut at a time.

Stepped backing plates may, of course, be used with the cutter of Figs. 16 and 17 so as to use the same set of blades to cut a range of gears of different tooth heights.

While the cutter of Figs. 16 and 17 is shown with double-edged finishing blades, single-edged finishing blades might also be employed and in this case, alternate finishing blades could be arranged to cut on opposite sides of a tooth space.

The hollow-grinding of the front faces of the blades is but one way in which to provide cutting edges at both sides of the blades. Many other ways of grinding the blades to secure this result will immediately suggest themselves to those skilled in the art. Thus, the front faces of the blades might be ground so that one cutting edge would lie in one plane and the opposite cutting edge in another plane. Again, the blades might be sharpened so that the cutting edge at one side of the blades would precede the cutting edge at the opposite side of the blades in the direction of rotation of the cutter head.

Under conditions where it is desirable to secure the highest possible quality of finish on the tooth surfaces of a non-generated gear, one or more burnishing blades may be inserted in the cutter head to make the cutter a combined cutting and burnishing tool. The burnishing blades will follow the finishing blades and may be used in place of one or more finishing blades, or additional slots may be provided in the cutter head to accommodate the burnishing blade or blades.

One form of burnishing blade that may be used in a tool constructed according to the present invention is shown in Fig. 23. This blade has a body portion 130 that is adapted to be inserted in a blade-receiving slot of the cutter head, and it has an operative portion 131 that projects beyond the face of the cutter head. In the form shown, the operating portion of the blade is provided with rounded-off burnishing surfaces on each side. These burnishing surfaces are denoted at 132 and 133, respectively.

The burnishing surfaces do not extend for the full length of the blades, but the burnishing surface 133 precedes the burnishing surface 132 in the direction of rotation of the blades. The purpose of this is to have the two burnishing surfaces bear simultaneously on opposite sides of the tooth slots of the gear blank so as to obtain the requisite pressure for the burnishing action. The action of the burnishing blade is illustrated in Fig. 24 where 134 denotes a spiral bevel or hypoid gear blank and 136 one of the tooth slots of this blank. As is clearly to be seen, one side of the burnishing blade will enter the tooth slot 136 before the other side does and likewise one side of the blade will leave the tooth slot before the other side does. In order to have the burnishing blade bear on both sides of the slot, then, the two burnishing surfaces 132 and 133 must be spaced from one another in the direction of rotation of the cutter.

The sides of the burnishing blade are inclined to one another in accordance with the included angle between the sides of the tooth spaces of the gear being finished and the maximum width (Fig. 24) of the burnishing blade at any point in its height is equal to the finished width of the tooth slot of the gear at the corresponding point. The blades may be milled or ground off on opposite sides at 134 and 135, respectively, so as to avoid interference with the action of the burnishing surfaces 132 and 133, respectively. The burnishing blade is not relieved either on its top or on its sides and is of uniform height throughout its length.

The operation of the tool when burnishing blades are used will be similar to its operation when only cutting blades are employed. The stocking-out blades will cut first, removing the greater portion of stock left on after the roughing-out operation, and then the finishing blades will remove the thin film of stock left by the stocking-out blades, and finally the burnishing blades will pass over the finished surfaces, ironing the same out and removing any ridges or scratches from the finished tooth surfaces. When the last burnishing blade has passed through a tooth slot, the blank will be indexed.

In ordinary gear cutting practice, it is necessary to withdraw the work support from the tool to index the blank and it is also necessary to withdraw the work support from the tool to permit chucking of a new blank on the work support or removal of a completed gear. The work support must be withdrawn from the tool for the chucking or de-chucking operation to a greater distance than for indexing. I have already explained how with the present invention withdrawal of the work from the tool for indexing is eliminated. I shall now explain how it is possible also to eliminate the withdrawal of the work support from the tool for chucking or dechucking.

This additional advantage is obtainable by providing a recess in the gap-portion of the cutter head, as indicated at 120 in Figs. 1, 2, 16, 17, and 15. This recess may be of any suitable shape. It may simply be a beveled-off recess, as shown, with the deepest portion at the periphery of the cutter head.

The function of this recess is illustrated in Fig. 15, where there is shown a cutter C constructed according to this invention in operative relation with a tapered gear blank G. The gear blank is shown centered on the guide or pilot portion 122 of a work-arbor 123 and clamped against this arbor by a clamp-plate 124 and a draw-bar 125. The clamp-plate 124 is slotted in the usual manner so that when rotated into the correct position, it can be slipped over the head of the draw-bar 125.

When the gear G is finished, the gear cutting machine is stopped with the recess 120 in the gap 121 of the cutter C abreast of the gear. The draw-bar 125 is released and the clamping plate 124 slipped over its head. Then the completed gear can be taken off of the work-spindle. It is not necessary to withdraw the work away from the cutter. The slot or recess 120 in the cutter permits the gear G to be moved forward far enough to clear the centering or pilot-portion 122 of the arbor and the draw-bar. A new gear blank can be placed on the work-arbor also without moving the work support away from the cutter, the recess 120 in the cutter head again permitting freedom of movement of the blank on to the arbor.

The elimination of the necessity of withdrawing the work support for chucking and de-chucking results in a saving in time of the operation of the machine and therefore is a distinct advantage.

While it is preferable to make the stocking blades of varying height, this is not necessary. They might be all made of the same height and the various blades could then have their sides milled or ground off to provide cutting lands or ribbons at the required height.

In all of the shown embodiments, the stocking blades increase in height in the direction of rotation of the cutter. This arrangement is, however, not essential. With ribbon cutting surfaces, such as shown, the order of the stocking blades might be reversed for instance, and the first stocking blade to cut might be the blade cutting at the deepest part of the tooth space while the last one to cut might be the blade operating at the top of the tooth space.

In the various embodiments of the invention illustrated, the blades are shown with straight cutting edges, as is required for cutting longitudinally curved tooth non-generated gears having straight profiles. If the gears have curved profiles, the blades would be made with correspondingly curved cutting edges.

A number of different embodiments of the invention have been illustrated, but the invention is capable of still further modification and this application is intended to cover any variations, uses, or adaptations of the invention following, in general, the principles of the invention and including such departures from the present disclosure as come within known or customary practice in the gear art and as may be applied to the essential features hereinbefore set forth and as fall within the scope of the invention or the limits of the appended claims.

Having thus described my invention, what I claim is:

1. In a gear cutting tool, a rotary head, a plurality of stocking blades followed by one or more finishing blades projecting from one side face of said head in the general direction of the axis of the head and being arranged circularly but only part way around the periphery of the head to leave a gap between the last and first blades, said stocking blades having narrow cutting lands on the sides thereof that are relieved to provide short side cutting edges, the cutting lands of different blades being at progressively varying distances from the face of the cutter head but overlapping so that the short side cutting edges together cover the whole height of a tooth surface, and said finishing blade or blades having cutting edges adapted to cut the whole height of the tooth sides and radially offset with regard to corresponding side cutting edges of the stocking blades to take finishing cuts.

2. A gear cutting tool comprising a rotary head and a series of stocking blades followed by one or more finishing blades, said blades projecting from one side face of the head in the general direction of the axis of the head and being arranged circularly but only part-way around the periphery of the head with a gap between the last and first blades, said stocking blades having cutting portions which project different distances from the face of the cutter head to cut progressively deeper into a gear blank to the full depth of the tooth spaces of the blank as a limit and having opposite side cutting edges which lie, respectively, in different surfaces of revolution coaxial with the head, and said finishing blade or blades having side cutting edges of a height to cut the full height of the tooth sides, opposite finish cutting edges lying in surfaces of revolution coaxial with the head but of greater and less radius, respectively, than the surfaces of revolution in which corresponding cutting edges of the stocking blades lie, the finishing blades which have cutting edges for cutting the same sides of a tooth space being spaced apart angularly around the periphery of the head a distance greater than the face width of the gear to be finished whereby no two corresponding finish-cutting edges are in engagement with the gear blank at the same time.

3. A gear cutting tool comprising a rotary head and, successively, a series of stocking blades, one or more finishing blades, and one or more burnishing blades, said blades being rigidly secured to the head and projecting from one side face of the head in the general direction of the axis of the head and being arranged only part-way around the periphery of the head with a gap between the last and first blades, said stocking blades having cutting portions which project different distances from the face of the cutter head to cut progressively deeper into a gear blank to the full depth of the tooth spaces of the blank as a limit and having opposite side cutting edges which lie, respectively, in different surfaces of revolution coaxial of the head, said finishing blade or blades having side cutting edges of a height to cut the full height of the tooth sides, opposite finish cutting edges lying in surfaces of revolution coaxial with the head but of greater and less radius, respectively, than the surfaces of revolution in which corresponding cutting edges of the stocking blades lie, and said burnishing blade or blades having non-relieved surfaces on opposite sides which are adapted to engage simultaneously both sides of a tooth space as they pass through said tooth space.

4. A gear cutting tool comprising a rotary head and a series of cutting blades followed by one or more burnishing blades, said blades being rigidly secured to the head and projecting from one side face of the head in the general direction of the axis of the head and being arranged circularly but only part-way around the periphery of the head with a gap between the last and first blades to permit indexing a gear blank while said gap is abreast of the blank, each of said burnishing blades having burnishing surfaces on its opposite sides, the width of each burnishing blade measured across its burnishing surfaces being sufficient, and the burnishing surface on one side of a burnishing blade, being sufficiently in advance of the burnishing surface on the other side of the blade, to permit both burnishing surfaces to contact opposite sides of a tooth space simultaneously as the burnishing blade moves across the face of a gear blank in the rotation of the head.

5. A gear cutting tool, comprising a rotary head and a plurality of stocking blades and one or more finishing blades, said blades being rigidly secured to the head and projecting from one side face of the head in the general direction of the axis of the head and being arranged circularly but to extend part-way only around the periphery of the head with the stocking blades preceding the finishing blades in the direction of rotation of the head, said stocking blades being of progressively increasing height and of progressively decreasing width at their tips and said finishing blades being of uniform height, corresponding cutting edges of the different blades having the same inclination to the axis of the cutter, corresponding side cutting edges of the finishing blades being arranged at the same distance from the axis of the cutter when measured in a plane perpendicular to the axis of the cutter but at a different distance from the corresponding side cutting edges of the stocking blades whereby to produce the finishing cuts.

6. The method of cutting a non-generated gear which comprises employing a rotary tool that has a series of stocking blades followed by one or more finishing blades with the blades projecting from one side face of the tool in the general direction of the axis of the tool and arranged circularly but only part-way around the periphery of the tool with a gap between the last and first blades and in which the stocking blades are adapted to cut progressively deeper into the blank to the full depth of the tooth spaces as a limit and are so arranged as to leave a thin film of metal on the tooth side, and in which the finishing blade or blades is or are adapted to cut the full height of the tooth sides and have side cutting edges offset radially inwardly and outwardly, respectively, with reference to corresponding side cutting edges of the stocking blades so as to remove the thin film of metal left by the stocking-out blades and produce the final finished tooth surfaces, positioning said tool in operative relation with a gear blank so that the tool will cut to the full depth of the tooth spaces of the gear blank without feed, rotating the tool on its axis, holding the blank stationary while the cutting edges of the tool are in engagement with the blank, and indexing the blank once for each revolution of the tool during the time the gap of the tool is abreast of the blank.

7. A gear cutting tool comprising a rotary head, a plurality of stocking blades and one or more finishing blades, said blades being rigidly secured to the head and projecting from one side face of the head in the general direction of the axis of the head and being arranged circularly but only part-way around the periphery of the head with a gap between the last and first blades, said stocking blades having narrow cutting lands on opposite sides containing opposite side cutting edges each of which is adapted to cut less than the full height of a tooth surface of the gear to be produced, the several stocking blades being so formed that the edges for cutting the same side tooth surface overlap and together cut the full height of the tooth surface, said finishing blades having opposite side cutting edges of a length to cut the full height of the tooth surfaces, said stocking blades having their opposite side cutting edges parallel, respectively, to the opposite sides of the finishing blades but spaced apart, in any plane perpendicular to the axis of the cutter head, a distance less than that between the opposite side cutting edges of the finishing blades.

8. A gear cutting tool comprising a rotary head and a plurality of cutting teeth which are rigidly secured to the head and project beyond one side face of the head, certain of said teeth being roughing teeth and others of said teeth being finishing teeth, said roughing teeth being of progressively increasing height to cut deeper into a gear blank to the full depth of the tooth spaces of the blank as a limit and having opposite side cutting edges which lie, respectively, in different surfaces of revolution coaxial of the head, and said finishing teeth having opposite side cutting edges of a height to cut the full height of the tooth space and which lie, respectively, in surfaces of revolution coaxial with the head but different from the surfaces of revolution in which the rough cutting edges lie, the cutting edges at one side of the finishing blades being at a greater radial distance from the axis of the cutter than the corresponding cutting edges of the roughing blades and the cutting edges at the opposite side of the finishing blades being at a less radial distance from the axis of the cutter than corresponding cutting edges of the roughing blades.

9. The method of cutting a non-generated gear which comprises employing a rotary tool that has a plurality of roughing blades followed by one or more finishing blades with the blades arranged part-way only around the periphery of the tool with a gap between the last and first blades and that has the opposite side cutting edges of the finishing blades of a height to cut the full depth of the tooth surfaces of the gear and offset radially inwardly and outwardly, respectively with reference to the corresponding side cutting edges of the roughing blades, engaging said tool with the gear blank so that the tool will cut to the full depth of the tooth spaces of the gear blank without feed, rotating the tool on its axis and holding the blank stationary while the cutting edges of the tools are passing through a tooth space of the blank, and indexing the blank during the time the gap in the tool is abreast of the blank.

10. The method of cutting a non-generated gear which comprises employing a rotary tool that has a plurality of roughing blades followed by one or more finishing blades with the blades projecting from one side face of the tool in the general direction of the axis of the tool and arranged part-way only around the periphery of the tool with a gap between the last and first blades and in which the opposite side cutting edges of the finishing blades are of a height to cut the full depth of the tooth surfaces of the gear and are offset radially inwardly and outwardly, respectively with reference to corresponding side cutting edges of the roughing blades, engaging said tool with the gear blank so that the tool will cut to the full depth of the tooth spaces of the blank without feed movement, rotating the tool on its axis and holding the blank stationary while the cutting edges of the tool are passing through a tooth space of the blank and indexing the blank during the time that the gap in the tool is abreast of the blank.

11. A gear cutter comprising a rotary head and a plurality of blades which are rigidly secured thereto to project beyond one side face of the head and which are arranged circularly part-way around the periphery of the head with a gap between the last and first blades, said blades having opposite side cutting edges, one portion of said blades increasing in height around the periphery of the head and another portion of said blades being of the same height, the distance between opposite side cutting edges of the first portion of blades being constant measured radially of the axis of the head in any plane perpendicular to the axis of the head and being less than the distance between opposite side cutting edges of the last named portion of blades, and the distance between the last named cutting edges being uniform.

12. A gear cutting tool comprising a rotary head and a plurality of cutting blades arranged circularly about the axis of the head, each of the blades having a cutting portion at one end which projects beyond one side face of the head, a plate secured to the other side face of the head, said plate being formed with steps of different heights against which the opposite ends of different blades may seat to determine the axial position of such blades, and means threaded into said plate to abut against the last named ends of certain of said blades to adjust said particular blades axially, and means for securing the blades to the head in any adjusted position.

13. A gear cutter comprising a rotary head and a plurality of cutting blades which are rigidly secured to the head to project beyond one side face of the head in the general direction of the axis of the head, certain of said blades being inside cutting blades and others of said blades being outside cutting blades, the inside cutting blades being arranged in one group extending part-way around the periphery of the head and the outside cutting blades being arranged in another group extending around another part of the periphery of the head and there being a peripheral gap between the last blade of one group and the first blade of the other, the gap being of sufficient peripheral extent to permit indexing of the blank when this gap is abreast of the blank in the rotation of the cutter.

14. A gear cutter comprising a rotary head and a plurality of cutting blades which are rigidly secured to the head to project beyond one side face of the head in the general direction of the axis of the head, certain of said blades having inside cutting edges and others of said blades having outside cutting edges, the inside cutting edges being arranged in one group extending part-way around the periphery of the head and the outside cutting blades being arranged in another group extending around another part of the periphery of the head, and there being a peripheral gap between the last blade of one group and the first blade of the other, said gap being of sufficient peripheral extent to permit indexing the blank when this gap is abreast of the blank in the rotation of the cutter, and the last blade of each group being offset radially outwardly or inwardly, respectively, with reference to other blades of the group to form an outside or inside finish cutting blade, respectively.

15. A gear cutter comprising a rotary head and a plurality of cutting blades which are rigidly secured to the head to project beyond one side face of the head in the general direction of the axis of the head, certain of said blades having inside cutting edges and others of said blades having outside cutting edges, the inside cutting blades being arranged in one group extending part-way around the periphery of the head and the outside cutting blades being arranged in another group extending around another part of the periphery of the head, and there being a peripheral gap between the last blade of one group and the first blade of the other, said gap being of sufficient peripheral extent to permit indexing the blank when this gap is abreast of the blank in the rotation of the cutter, certain blades of each group being roughing blades and the last blade or blades of each group being finishing blades, the roughing blades in each group being of progressively increasing height to cut successively deeper into a gear blank and the finishing blades of the two groups being of the full height of the tooth surfaces to be cut and having their side cutting edges offset radially inwardly and outwardly, respectively, with reference to the side cutting edges of the roughing blades of said group whereby to constitute finish-cutting edges.

16. A gear cutter comprising a rotary head and a plurality of cutting blades which are rigidly secured to the head to project beyond one side face of the head in the general direction of the axis of the head, certain of the blades having inside cutting edges and others of the blades having outside cutting edges, the inside cutting blades being arranged in one group extending part-way around the periphery of the head and the outside cutting edges being arranged in another group extending around another part of the periphery of the head, and there being a peripheral gap between the last blade of one group and the first blade of the other, said gap being of sufficient peripheral extent to permit indexing the blank when this gap is abreast of the blank in the rotation of the cutter, certain blades of each group being roughing blades and the last blade or blades of each group being finishing blades, the finishing blades of the two groups being of the full height of the tooth surfaces to be cut and having their side cutting edges offset radially inwardly or outwardly, respectively, with reference to the side cutting edges of the roughing blades of the group, and each finishing blade being spaced peripherally from the next preceding blade a distance greater than the face width of the gear to be cut so that no other blade is in engagement with the gear at the time a finishing blade is cutting.

17. A gear cutter comprising a rotary head and a plurality of cutting blades which are rigidly secured to the head to project beyond one side face of the head in the general direction of the axis of the head, certain of said blades having inside cutting edges and others of said blades having outside cutting edges, the inside cutting blades being arranged in one group extending part-way around the periphery of the head and the outside cutting blades being arranged in another group extending around another part of the periphery of the head, and there being a peripheral gap between the last blade of one group and the first blade of the other, said gap being of sufficient peripheral extent to permit indexing the blank when this gap is abreast of the blank in the rotation of the cutter, certain blades of each group being roughing blades and the last blade or blades of each group being finishing blades, the roughing blades of each group being of progressively increasing height to cut successively deeper into a gear blank, and each finishing blade being spaced peripherally from the next preceding blade a distance greater than the face-width of the gear to be cut so that no other blade is in engagement with the gear blank when a finishing blade is cutting, said finishing blades being of the full height of the tooth surfaces to be cut and having their side cutting edges offset radially inwardly or outwardly, respectively, with reference to the side cutting edges of the roughing blades of their group whereby to constitute finish-cutting edges.

18. A gear cutting tool comprising a rotary head and a plurality of roughing blades followed by one or more finishing blades, said blades projecting beyond one side face of the head in the general direction of the axis of the head and being arranged circularly but only part-way around the periphery of the head with a gap between the last and first blades so that a gear blank being cut may be indexed when said gap is abreast of the blank without relative withdrawal of the cutter, said finishing blade or blades having side cutting edges which are offset radially inwardly or outwardly, respectively, with reference to the corresponding side cutting edges of the roughing blades and each finishing blade being spaced peripherally from the next preceding blade a distance greater than the face-width of the gear to be cut.

19. A gear cutting tool comprising a rotary head and a plurality of roughing blades which project beyond one side face of the head in the general direction of the axis of the head and are arranged circularly but only part-way around the periphery of the head with a gap between the last and first blades so that a gear blank being cut may be indexed when said gap is abreast of the blank without relative withdrawal of the cutter, certain of the blades having outside cutting edges and others of the blades having inside cutting edges and certain of the blades being roughing blades and others of the blades being finishing blades, said finishing blades having side cutting edges which are offset radially inwardly and outwardly, respectively, with reference to corresponding side cutting edges of the roughing blades, and each finishing blade being spaced peripherally from the next preceding blade a distance greater than the face width of the gear to be cut.

20. A gear cutting tool comprising a rotary head and a plurality of cutting blades which project beyond one side face of the head in the general direction of the axis of the head and are arranged circularly but only part-way around the periphery of the head with a gap between the last and first blades so that a gear blank being cut may be indexed when said gap is abreast of the blank without relative withdrawal of the cutter, alternate blades having opposite side cutting edges, and certain of said blades being roughing blades and others being finishing blades, and the finishing blades having their cutting edges offset radially inwardly and outwardly, respectively, with reference to corresponding side cutting edges of the roughing blades, and each finishing blade being spaced peripherally from the next preceding blade a distance greater than the face width of the gear to be cut.

21. A face-mill gear cutter for cutting gears by continuous rotation of the cutter and intermittent step-by-step indexing of the gear being cut, comprising a rotary head and a plurality of cutting blades which project beyond one side face of the head and are arranged circularly part-way around the periphery of the head with a gap between the last and first blades, the last blade or blades being a finishing blade or finishing blades and having a cutting edge or edges which is or are of sufficient height to finish-cut the whole side of a tooth of the blank and is or are slightly offset in a direction radial of the axis of the cutter head relative to those cutting edges of preceding blades which are adapted to cut on the same side of a tooth space of a gear blank, and said gap being of sufficient angular extent to permit indexing the blank without relative withdrawal of the cutter from the blank when the gap is abreast of the blank in the rotation of the cutter.

22. A face-mill gear cutter comprising a rotary head and a plurality of roughing blades followed by one or more finishing blades, said blades projecting beyond one side face of the head and being arranged circularly but only part-way around the periphery of the head with a gap between the last finishing and the first roughing blade so that the gear blank being cut may be indexed when said gap is abreast of the blank in the rotation of the cutter without relative withdrawal of the cutter from the blank, the roughing and finishing blades having inside and outside cutting edges and the inside and outside cutting edges of the finishing blades being offset radially inwardly and outwardly, respectively, with reference to the corresponding side cutting edges of the roughing blades, each finish-cutting edge being of a height to cut the full depth of a tooth surface of the blank.

23. The method of cutting a longitudinally curved tooth gear which comprises employing a face-mill gear cutter that has a plurality of roughing blades followed by one or more finishing blades arranged circularly part-way only around the periphery of the cutter with a gap between the last finishing blade and the first roughing blade and which has finishing blades whose side cutting edges are of sufficient height to cut the full depth of the tooth surfaces of the gear and whose inside cutting edges are disposed at a smaller radial distance from the axis of the cutter than the inside cutting edges of the roughing blades and whose outside cutting edges are disposed at a greater radial distance from the axis of the cutter than the outside cutting edges of the roughing blades, adjusting said cutter into engagement with a gear blank so that the cutter will cut to the full depth of the tooth spaces of the blank without relative depthwise feed of the cutter, and rotating said cutter continuously in engagement with the blank and indexing the blank when the gap in the cutter is abreast of the blank.

JAMES E. GLEASON.